US012657931B2

(12) United States Patent (10) Patent No.: US 12,657,931 B2
Sakata et al. (45) Date of Patent: Jun. 16, 2026

(54) INFORMATION PROCESSING APPARATUS, GENERATION METHOD, INFORMATION PROCESSING METHOD, AND COMPUTER-READABLE MEDIUM

(71) Applicant: NEC Corporation, Tokyo (JP)

(72) Inventors: Masayuki Sakata, Tokyo (JP); Asako Fujii, Tokyo (JP)

(73) Assignee: NEC CORPORATION, Tokyo (JP)

(*) Notice: Subject to any disclaimer, the term of this patent is extended or adjusted under 35 U.S.C. 154(b) by 4 days.

(21) Appl. No.: 18/841,479

(22) PCT Filed: Mar. 11, 2022

(86) PCT No.: PCT/JP2022/010877
§ 371 (c)(1),
(2) Date: Aug. 26, 2024

(87) PCT Pub. No.: WO2023/170912
PCT Pub. Date: Sep. 14, 2023

(65) Prior Publication Data
US 2025/0037476 A1 Jan. 30, 2025

(51) Int. Cl.
*G06V 20/58* (2022.01)
*G06T 7/20* (2017.01)
*G06T 7/70* (2017.01)
*G06V 20/70* (2022.01)

(52) U.S. Cl.
CPC ............... *G06V 20/58* (2022.01); *G06T 7/20* (2013.01); *G06T 7/70* (2017.01); *G06V 20/70* (2022.01)

(58) Field of Classification Search
CPC .................................................... G06V 20/58

USPC ......................................................... 348/148
See application file for complete search history.

(56) References Cited

U.S. PATENT DOCUMENTS

2018/0336424 A1* 11/2018 Jang ........................ G06N 3/044

FOREIGN PATENT DOCUMENTS

| JP | 2010-267134 A | 11/2010 |
| JP | 2016-076073 A | 5/2016 |
| JP | 2017-117139 A | 6/2017 |
| JP | 2020-003971 A | 1/2020 |
| JP | 2020-027540 A | 2/2020 |
| JP | 2021-189512 A | 12/2021 |

(Continued)

OTHER PUBLICATIONS

International Search Report for PCT Application No. PCT/JP2022/010877, mailed on May 24, 2022.

*Primary Examiner* — Amir Shahnami
(74) *Attorney, Agent, or Firm* — Sughrue Mion, PLLC

(57) ABSTRACT

Provided is an information processing apparatus (10) including: a specification means (11) for specifying, from a period within a video captured by an image capturing apparatus installed in a vehicle, a period in which information being recognized from a video matches with a rule according to a specific scene; an acquisition means (12) for acquiring a data set being a combination of information being recognized from a video in the period specified by the specification means and a correct label indicating whether the video in the period is a video of the specific scene; and a generation means (13) for executing learning, based on the data set acquired by the acquisition means, and generating a trained model for estimating whether a video in a specific period is a video of the specific scene.

6 Claims, 7 Drawing Sheets

(56)          References Cited

FOREIGN PATENT DOCUMENTS

| | | |
|---|---|---|
| WO | 2020/149242 A1 | 7/2020 |
| WO | 2021/111670 A1 | 6/2021 |

* cited by examiner

Fig. 6

| VIDEO ID | SPECIFIC SCENE | PERIOD | CAPTURED-OBJECT INFORMATION | | | | | | CORRECT LABEL |
|---|---|---|---|---|---|---|---|---|---|
| | | | CAPTURED-OBJECT ID | TYPE OF CAPTURED-OBJECT | DISTANCE (m) BETWEEN VEHICLE 30 AND CAPTURED-OBJECT | SPEED (km/h) OF CAPTURED-OBJECT WITH RESPECT TO VEHICLE 30 | POSITION OF CAPTURED-OBJECT WITH RESPECT TO VEHICLE 30 | ... | |
| VIDEO A | CUTTING IN | STARTING POINT A11, ENDING POINT A12 | CAPTURED-OBJECT A | VEHICLE | 50 | 30 | 10 DEGREES TO RIGHT FRONT | ... | CORRECT |
| | | | CAPTURED-OBJECT B | ... | ... | ... | ... | ... | |
| | | | ... | ... | ... | ... | ... | ... | |
| | CUTTING OUT | STARTING POINT A21, ENDING POINT A22 | ... | ... | ... | ... | | ... | IN-CORRECT |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |
| VIDEO B | ... | ... | ... | ... | ... | ... | ... | ... | ... |

INFORMATION PROCESSING APPARATUS, GENERATION METHOD, INFORMATION PROCESSING METHOD, AND COMPUTER-READABLE MEDIUM

This application is a National Stage Entry of PCT/JP2022/010877 filed on Mar. 11, 2022, the contents of all of which are incorporated herein by reference, in their entirety.

TECHNICAL FIELD

The present disclosure relates to an information processing apparatus, a generation method, an information processing method, and a non-transitory computer-readable medium storing a program.

BACKGROUND ART

Patent Literature 1 discloses a technique of detecting a moving object that possibly interrupts a lane where an own vehicle travels, at an early stage, based on an image around the own vehicle.

CITATION LIST

Patent Literature

Patent Literature 1: Japanese Unexamined Patent Application Publication No. 2020-003971

SUMMARY OF INVENTION

Technical Problem

However, for example, Patent Literature 1 does not examine extraction of a video of a scene such as an interruption scene, from videos being accumulated (recorded).

In view of the above-mentioned problem, an object of the present disclosure is to provide a technique of appropriately extracting a video of a specific scene from videos being accumulated.

Solution to Problem

In a first aspect according to the present disclosure, there is provided an information processing apparatus including: a specification means for specifying, from a period within a video captured by an image capturing apparatus installed in a vehicle, a period in which information being recognized from a video matches with a rule according to a specific scene; an acquisition means for acquiring a data set being a combination of information recognized from a video in the period specified by the specification means and a correct label indicating whether the video in the period is a video of the specific scene; and a generation means for executing learning, based on the data set acquired by the acquisition means, and generating a trained model for estimating whether a video in a specific period is a video of the specific scene.

Further, in a second aspect according to the present disclosure, there is provided an information processing apparatus including: a specification means for specifying, from a period within a video captured by an image capturing apparatus installed in a vehicle, a period in which information being recognized from a video matches with a rule according to a specific scene; and an estimation means for estimating, based on information recognized from a video in the period specified by the specification means and a trained model, whether the video is a video of the specific scene.

Further, in a third aspect according to the present disclosure, there is provided a generation method including: specifying, from a period within a video captured by an image capturing apparatus installed in a vehicle, a period in which information being recognized from a video matches with a rule according to a specific scene; acquiring a data set being a combination of information recognized from a video in the specified period and a correct label indicating whether the video in the period is a video of the specific scene; and executing learning, based on the acquired data set, and generating a trained model for estimating whether a video in a specific period is a video of the specific scene.

Further, in a fourth aspect according to the present disclosure, there is provided an information processing method including: specifying, from a period within a video captured by an image capturing apparatus installed in a vehicle, a period in which information being recognize from a video matches with a rule according to a specific scene; and estimating, based on information recognized from a video in the specified period and a trained model, whether the video is a video of the specific scene.

Further, in a fifth aspect according to the present disclosure, there is provided a non-transitory computer-readable medium configured to store a program causing a computer to execute processing of: specifying, from a period within a video captured by an image capturing apparatus installed in a vehicle, a period in which information being recognize from a video matches with a rule according to a specific scene; acquiring a data set being a combination of information recognized from a video in the specified period and a correct label indicating whether the video in the period is a video of the specific scene; and executing learning, based on the acquired data set, and generating a trained model for estimating whether a video in a specific period is a video of the specific scene Further, in a sixth aspect according to the present disclosure, there is provided a non-transitory computer-readable medium configured to store a program causing a computer to execute processing of: specifying, from a period within a video captured by an image capturing apparatus installed in a vehicle, a period in which information being recognized from a video matches with a rule according to a specific scene; and estimating, based on information recognized from a video in the specified period and a trained model, whether the video is a video of the specific scene.

Advantageous Effects of Invention

According to one aspect, a video of a specific scene can be extracted appropriately from videos being accumulated.

BRIEF DESCRIPTION OF DRAWINGS

FIG. 6 is a diagram illustrating one example of a learning DB according to the example embodiment.

EXAMPLE EMBODIMENT

The principle of the present disclosure is described with reference to some example embodiments. It should be understood that those example embodiments are described for illustration purposes only and assist a person skilled in the art to understand and implement the present disclosure without implying any limitation on the scope of the present disclosure. The disclosure described in the present specification is implemented by various methods other than those described above.

In the following description and the claims, all the technical and scientific terms used in the present specification have the same meaning as commonly understood by a person skilled in the art to which the present disclosure belongs, unless otherwise defined.

With reference to the drawings, the example embodiments of the present disclosure are described below.

First Example Embodiment

<Configuration>
<<Configuration of Information Processing Apparatus 10 that Executes Learning Processing>>

Figure 1:
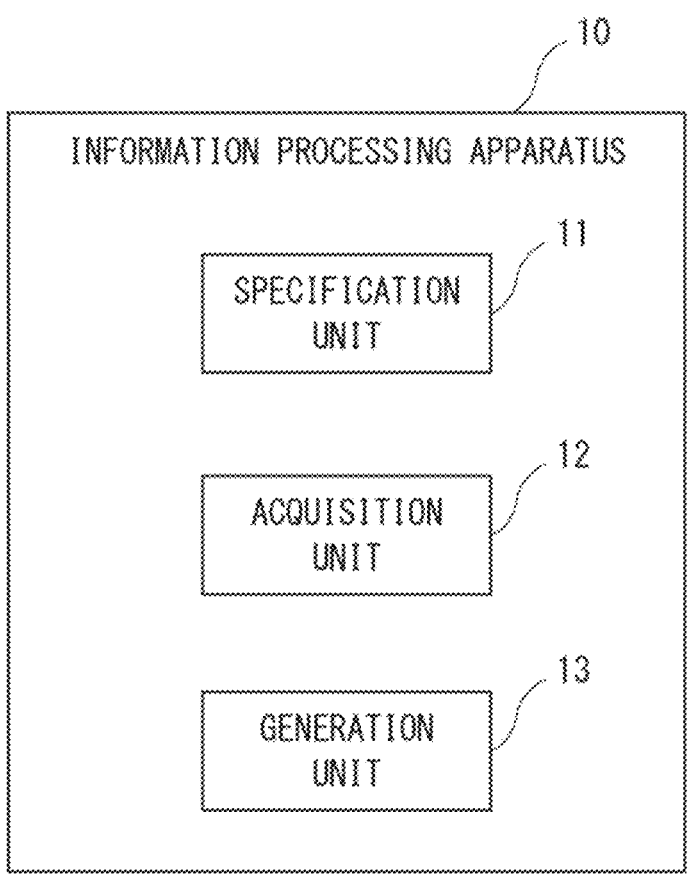
FIG. 1 is a diagram illustrating one example of a configuration of an information processing apparatus that executes leaning processing according to an example embodiment.

With reference to FIG. 1, description is made on a configuration of an information processing apparatus 10 that executes learning processing according to an example embodiment. FIG. 1 is a diagram illustrating one example of the configuration of the information processing apparatus 10 that executes the learning processing according to the example embodiment. The information processing apparatus 10 includes a specification unit 11, an acquisition unit 12, and a generation unit 13. Each of the units may be achieved through collaboration between one or more programs installed in the information processing apparatus 10 and hardware such as a processor 101 and a memory 102 of the information processing apparatus 10.

The specification unit 11 specifies, from a period within a video captured by an image capturing apparatus installed in a vehicle, a period in which information being recognize from a video matches with a rule according to a specific scene. The acquisition unit 12 acquires a data set being a combination of information being recognized from a video in the period being specified by the specification unit 11 and a correct label indicating whether the video in the period is a video of the specific scene. The generation unit 13 executes learning, based on the data set being acquired by the acquisition unit 12, and generating a trained model for estimating whether a video in a specific period is a video of the specific scene.

<<Configuration of Information Processing Apparatus 20 that Executes Estimation Processing>>

Figure 2:
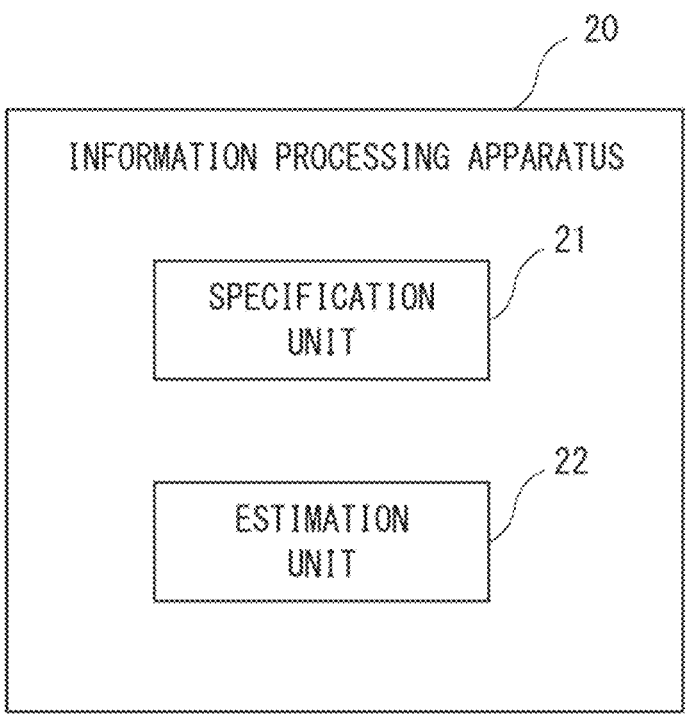
FIG. 2 is a diagram illustrating one example of a configuration of an information processing apparatus that executes estimation processing according to the example embodiment.

Next, with reference to FIG. 2, description is made on a configuration of an information processing apparatus 20 that executes estimation processing according to the example embodiment. FIG. 2 is a diagram illustrating one example of the configuration of the information processing apparatus 20 that executes the estimation processing according to the example embodiment. The information processing apparatus 20 includes a specification unit 21 and an estimation unit 22. Each of the units may be achieved through collaboration between one or more programs installed in the information processing apparatus 20 and hardware such as a processor and a memory of the information processing apparatus 20.

The specification unit 21 specifies, from a period within a video captured by an image capturing apparatus 31 installed in a vehicle 30, a period in which information being recognize from a video matches with a rule according to a specific scene. The estimation unit 22 estimates, based on information being recognized from a video in the period being specified by the specification unit 21 and a trained model, whether the video is a video of the specific scene.

<Hardware Configuration>

Figure 3:
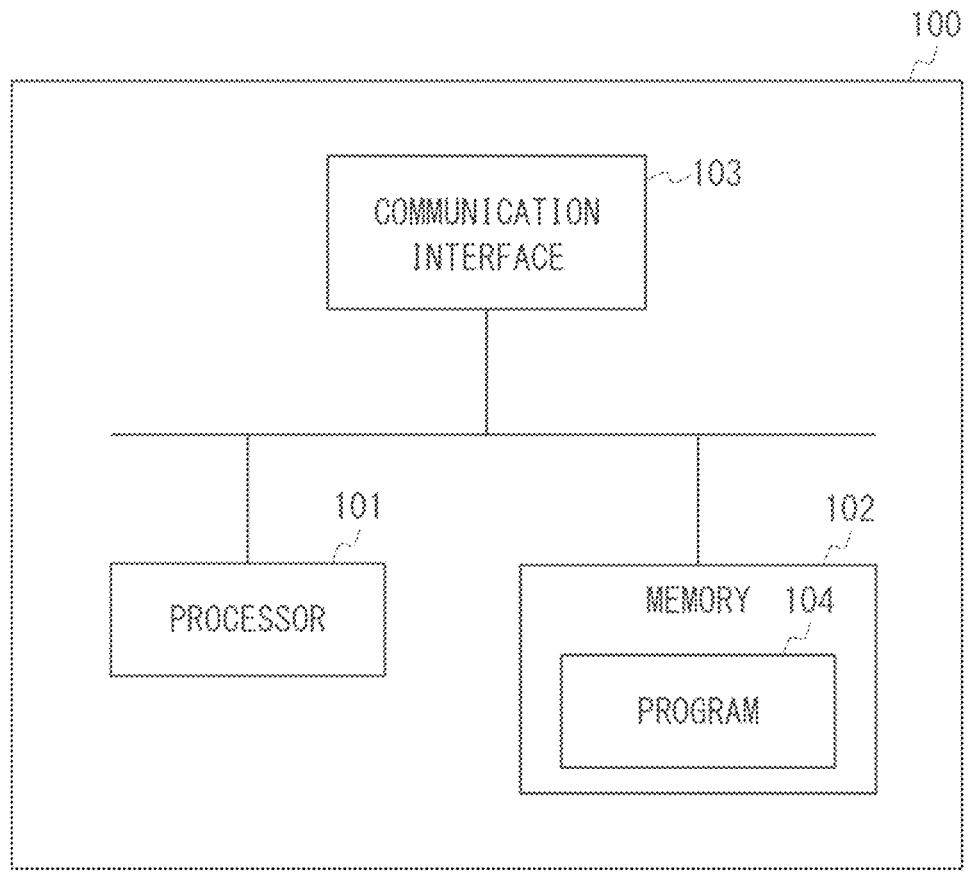
FIG. 3 is a diagram illustrating a hardware configuration example of the information processing apparatus according to the example embodiment.

FIG. 3 is a diagram illustrating a hardware configuration example of the information processing apparatus 10 and the information processing apparatus 20 according to the example embodiment. Description is made below by giving the information processing apparatus 10 as an example. Note that the hardware configuration of the information processing apparatus 20 may be similar to the hardware configuration of the information processing apparatus 10.

In the example of FIG. 3, the information processing apparatus 10 (computer 100) includes the processor 101, the memory 102, and a communication interface 103. Those units may be connected to each other via a bus or the like. The memory 102 stores at least a part of a program 104. The communication interface 103 includes an interface required for communication with another network element.

When the program 104 is executed through collaboration between the processor 101, the memory 102, and the like, at least part of the processing of the example embodiment of the present disclosure is executed by the computer 100. The memory 102 may be any freely selected type suitable for a local technique network. As a non-limiting example, the memory 102 may be a non-transitory computer-readable storage medium. Further, the memory 102 may be implemented by using any freely selected data storage technique as appropriate, such as a semiconductor-based memory device, a magnetic memory device and system, an optical memory device and system, a fixed memory, and a removable memory. Only one memory 102 is illustrated in the computer 100, but some memory modules that are physically different from each other may be present in the computer 100. The processor 101 may be any freely selected type. The processor 101 may include one or more of a general-purpose computer, a dedicated computer, a micro processor, a digital signal processor (DSP), and, as a non-limiting example, a processor based on a multi-core processor architecture. The computer 100 may include a plurality of processors such as an application-specific integrated circuit chip temporally dependent on a clock that synchronizes a main processor.

The example embodiment of the present disclosure may be implemented by hardware, a dedicated circuit, software, a logic, or any freely selected combination thereof. Some aspects may be implemented by hardware, and other aspects may be implemented by firmware or software that may be executed by a controller, a micro processor, or other computing devices.

The present disclosure further provides at least one computer program product that is stored tangibly in a non-transitory computer-readable storage medium. The computer program product includes a computer-executable command such as a command include in a program module, and is executed on a device on a target solid processor or virtual processor, and thereby the process or the method of the present disclosure is executed. The program module includes a routine, a program, a library, an object, a class, a component, a data structure, or the like that executes a specific task or implements a specific abstract data type. The functions of the program modules may be combined or divided between the program modules, as desired in various example embodiments. A machine-executable command of the program module can be executed locally or in a distributed device. In the distributed device, the program module can be arranged in both local and remote storage media.

A program code for executing the method of the present disclosure may be written in any freely selected combination of one or more programming languages. The program code is provided to a processor or a controller of a general-purpose computer, a dedicated computer, or other programmable data processing apparatuses. When the program code is executed by the processor or the controller, the function/ operation in the flowchart and/or the block diagram to be implemented is executed. The program code is executed entirely on a machine, partially on a machine as a standalone software package, partially on a machine and partially on a remote machine, or entirely on a remote machine or server.

The program van be stored by using a non-transitory computer-readable medium of various types, and can be supplied to a computer. The non-transitory computer-readable medium includes various types of tangible recording media. Examples of the non-transitory computer-readable medium include a magnetic recording medium, a magneto-optical recording medium, an optical disc medium, a semiconductor memory, and the like. Examples of the magnetic recording medium include a flexible disk, a magnetic tape, a hard disk drive, and the like. Examples of the magneto-optical recording medium include a magneto-optical disk and the like. Examples of the optical disc medium include a Blu-ray disc, a compact disc (CD) read only memory (ROM), a CD-recordable (R), a CD-rewritable (RW), and the like. Examples of the semiconductor memory include a solid state drive, a mask ROM, a programmable ROM (PROM), an erasable PROM (EPROM), a flash ROM, a random access memory (RAM), and the like. Further, the program may be supplied to a computer, in a form of a transitory computer-readable medium of various types. Examples of the transitory computer-readable medium include an electric signal, and optical signal, and electromagnetic wave. The transitory computer-readable medium is capable of supplying the program to a computer via a wired communication path such as an electric wire and an optical fiber or a wireless communication path.

Second Example Embodiment

Figure 4:
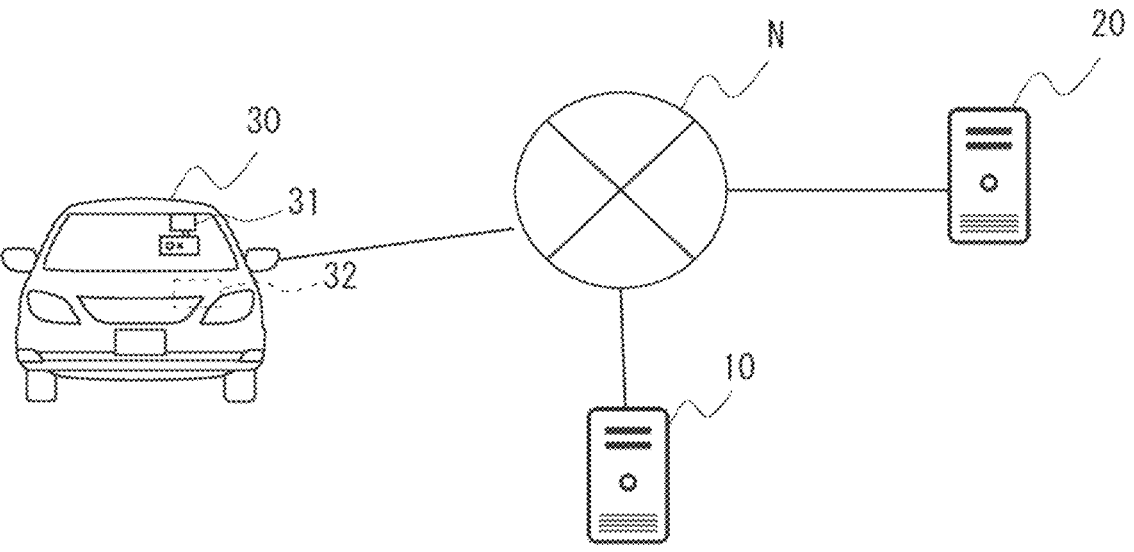
FIG. 4 is a diagram illustrating one example of a configuration of an information processing system according to an example embodiment.

Next, with reference to FIG. 4, description is made on a configuration of an information processing system 1 according to an example embodiment.
<System Configuration>
FIG. 4 is a diagram illustrating one example of the configuration of the information processing system 1 according to the example embodiment. In the example of FIG. 4, the information processing system 1 includes the information processing apparatus 10, the information processing apparatus 20, and the vehicle 30. Note that the numbers of information processing apparatuses 10, information processing apparatuses 20, and vehicles 30 are not limited to the example of FIG. 4.

In the example of FIG. 4, the information processing apparatus 10, the information processing apparatus 20, and the vehicle 30 are connected via a network N in a communicable manner. Examples of the network N include the Internet, a mobile communication system, a wireless local area network (LAN), short-range wireless communication such as Bluetooth Low Energy (BLE), a LAN, and a bus. Examples of the mobile communication system include the fifth generation mobile communication system (5G), the fourth generation mobile communication system (4G), the third generation mobile communication system (3G), the sixth generation mobile communication system (6G), and the like.

The vehicle 30 is a vehicle traveling on a road. Examples of the vehicle 30 include, but is not limited to, an automobile, a motorcycle, a motor-assisted bicycle, and a bicycle. The vehicle 30 includes the image capturing apparatus 31 and an electronic control unit (ECU) 32.

For example, the image capturing apparatus 31 may be a vehicle-mounted camera that captures the front of the vehicle 30. For example, the image capturing apparatus 31 may be provided on a dashboard of the vehicle 30. Further, for example, the image capturing apparatus 31 may be provided on a back side of a rear-view mirror of the vehicle 30.

For example, the ECU 32 may execute control relating traveling of the vehicle 30, or the like. For example, the ECU 32 may execute control of acceleration, braking, or the like, based on an operation by a driver of the vehicle 30. Further, for example, the ECU 32 may automatically execute control of acceleration, braking, or the like for the vehicle 30. In this case, for example, the ECU 32 may include a function of the advanced driver-assistance system (ADAS). Further, for example, the ECU 32 may include an automated driving function at a specific level.

For example, the ECU 32 may distribute a video captured by the image capturing apparatus 31 to the information processing apparatus 10 or the like through wireless communication. In this case, for example, a video captured by the image capturing apparatus 31 may be acquired by the information processing apparatus 10 via an external apparatus (for example, a file serve). Further, for example, the ECU 32 may record, in a recording apparatus, a video captured by the image capturing apparatus 31. In this case, the video being recorded may be recorded in the information processing apparatus 10 or the like via a portable recording medium (for example, a universal serial bus (USB) memory).

For example, the information processing apparatus 10 may be an apparatus such as a server, cloud computing, and a personal computer. The information processing apparatus 10 recognized captured-object information, based on a video captured by the image capturing apparatus 31 installed in the vehicle 30. Further, the information processing apparatus 10 specifies a period of a specific scene, based on the captured-object information being recognized and a rule being set in advance. Further, the information processing apparatus 10 executes machine learning, based on a determination result by a human on whether the period being specified is the specific scene.

For example, the information processing apparatus 20 may be an apparatus such as a personal computer, a smartphone, and cloud computing. The information processing apparatus 20 recognizes the captured-object information, based on the video captured by the image capturing apparatus 31 installed in the vehicle 30. Further, the information processing apparatus 20 specifies the period of the specific scene, based on the captured-object information being recognized and the rule being set in advance. Further, the information processing apparatus 20 estimates whether the period is the specific scene, based on a trained model being generated by the information processing apparatus 10 and the captured-object information in the period being specified.

\<Processing>

\<\<Leaning Processing>>

Figure 5:
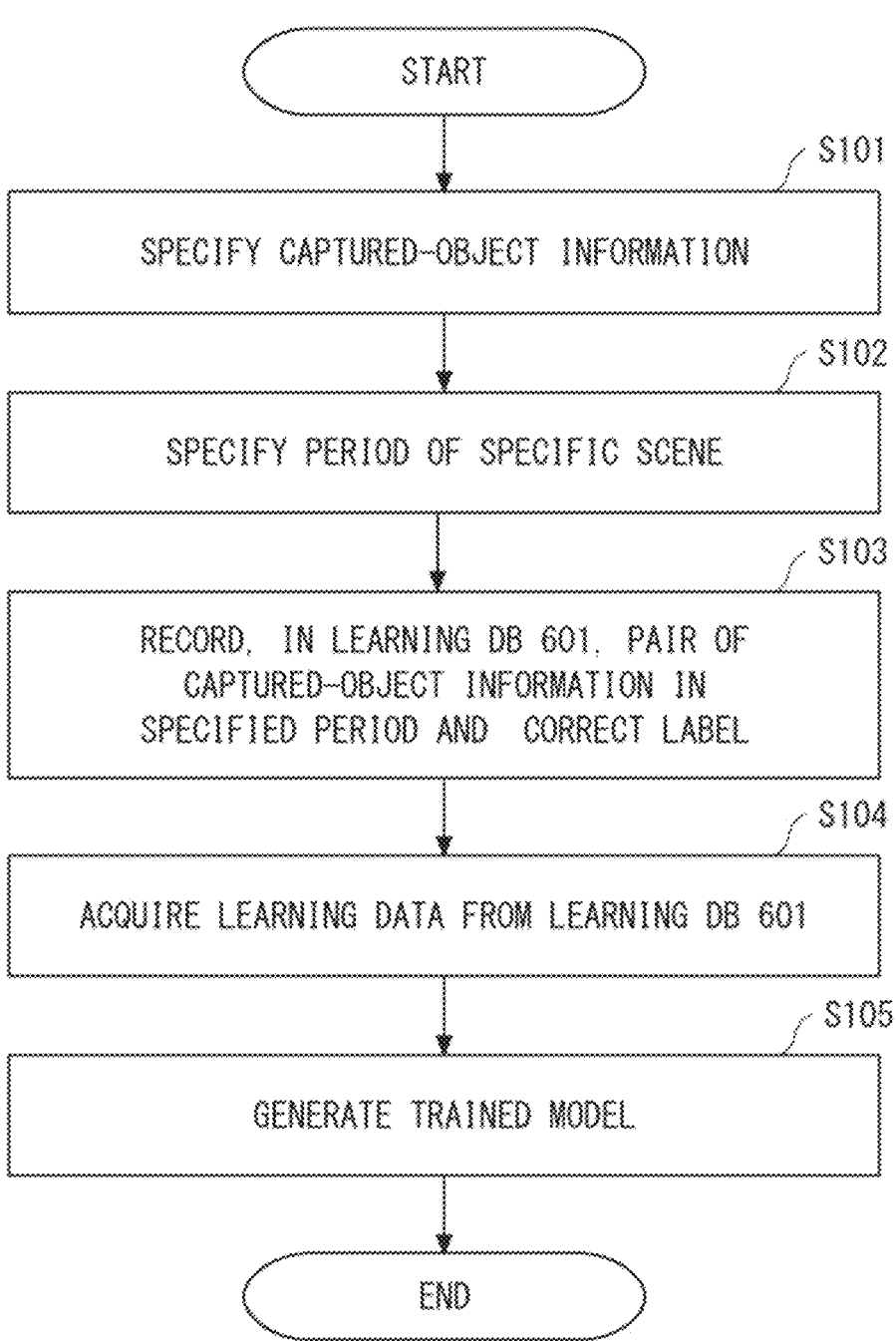
FIG. 5 is a flowchart illustrating one example of learning processing of the information processing apparatus according to the example embodiment.

Next, with reference to FIG. 5 to FIG. 6, description is made on one example of the learning processing of the information processing apparatus 10 according to the example embodiment. FIG. 5 is a flowchart illustrating one example of the learning processing of the information processing apparatus 10 according to the example embodiment. FIG. 6 is a diagram illustrating one example of a learning database (DB) 601 according to the example embodiment.

In step S101, the specification unit 11 of the information processing apparatus 10 specifies (recognizes) the captured-object information being information relating to the captured object, based on the video captured by the image capturing apparatus 31 installed in the vehicle 30. Herein, for example, the specification unit 11 may execute image recognition for each frame of the video, and may execute image recognition for a type of the captured object being another vehicle or the like and a position thereof with respect to the vehicle 30 in a three-dimension. Further, for example, the specification unit 11 may specify (calculate) the captured-object information, based on the position of the captured object on the pixel coordinate system in each frame of the video. In this case, for example, the specification unit 11 may specify, as the captured-object information, at least one of a distance between the vehicle 30 and the captured object, a speed of the captured object with respect to the vehicle 30, and a position of the captured object with respect to the vehicle 30. Note that, for example, the specification unit 11 may specify a speed of the vehicle 30, based on information being acquired from the ECU 32.

Note that, for example, the specification unit 11 may specify information relating to the captured object, based on the video captured by the image capturing apparatus 31 being a stereo camera. Further, for example, the specification unit 11 may specify information relating to the captured object by using artificial intelligence (AI), based on the video captured by the image capturing apparatus 31 being a camera. Further, for example, the specification unit 11 may specify information relating to the captured object by using information measured by light detection and ranging (Li-DAR), in addition to the video captured by the image capturing apparatus 31.

Subsequently, the specification unit 11 of the information processing apparatus 10 specifies, from the period within the video captured by the image capturing apparatus 31 installed in the vehicle 30, the period in which the captured-object information being recognized from the video matches with the rule (condition) according to the specific scene (step S102). Herein, for example, the specific scene may include a scene where a position of another vehicle is changed to the front of the vehicle 30 due to lane changing of the other vehicle (cutting in, interruption). Further, for example, the specific scene may include a scene where a position of another vehicle is changed from the front of the vehicle 30 due to lane changing of the other vehicle (cutting out, exiting). Further, for example, the specific scene may include a scene where the vehicle 30 changes a lane.

Further, for example, the rule according to the specific scene may be determined by an operator (administrator), and may be set in advance in the information processing apparatus 10. In this case, for example, the rule relating to interruption may include the following items (1) to (3). (1) A distance between the vehicle 30 and another vehicle is 10 meters or more. (2) A speed (relative speed) of another vehicle with respect to the vehicle 30 is 10 km/h or higher. (3) A position of another vehicle moves from a lane, which is adjacent to a lane (own lane) where the vehicle 30 travels (own lane), to the own lane within two seconds.

The specification unit 11 specifies, from a period of a first time length (for example, 10 hours) in which a video is captured by the image capturing apparatus 31, one or more periods of a second time length (for example, a few seconds) in which the captured-object information being recognized from the video matches with the rule according to the specific scene, the second time length being shorter than the first time length. With this, for example, the video of the specific scene can be specified in the vehicle 30 traveling for a predetermined period.

Subsequently, the specification unit 11 of the information processing apparatus 10 records, in the learning DB 601, the data (record) being a combination of the captured-object information being recognized from the video in the period being specified and the correct label indicating whether the video is the video of the specific scene (step S103). Note that the learning DB 601 may be recorded in a storage apparatus inside the information processing apparatus 10, or may be recorded in a storage apparatus outside the information processing apparatus 10.

In the example of FIG. 6, in the learning DB 601, one or more pieces of captured-object information and correct labels are recorded in association with a combination of a video ID, a specific scene, and a period. The video ID is identification information relating to the video captured by the image capturing apparatus 31. The period is a period being specified by the specification unit 11. The period may be indicated by a pair of data including a time length from the beginning of the video related with the video ID to the starting point of the period and a time length from the beginning of the video related to the video ID to the ending point of the period. For example, for each captured object ID being recognized from the video in the period, the captured-object information may include a type of the captured object, a distance between the vehicle 30 and the captured object, a speed of the captured object with respect to the vehicle 30, a position of the captured object with respect to the vehicle 30, or the like. The captured object ID is identification information relating to the captured object. The captured object ID may be allocated by the specification unit 11 when the captured object is recognized for the first time. For example, as a type of the captured object, a type such as a vehicle, a motorcycle, and a pedestrian may be included.

The correct label is information indicating whether the video in the period is the video of the specific scene. For example, the correct label may be set by a human by visually recognizing the video in the period being specified by the specification unit 11. With this, for example, it is possible to execute supervised learning based on a result on whether a video in each period being specified by the specification unit 11 is the video of the specific scene, which is acquired by a human.

Subsequently, the acquisition unit 12 of the information processing apparatus 10 acquires learning data from the learning DB 601 (step S104). Herein, the acquisition unit 12 acquires the data set being a combination of the information being recognized from the video being extracted by the specification unit 11 and the correct label indicating whether the video is the video of the specific scene.

Subsequently, the generation unit 13 of the information processing apparatus 10 generates the trained model for estimating whether a video is the video of the specific scene, through learning based on the data set being acquired by the acquisition unit 12 (step S105). With this, for example, when the accuracy of rule-based determination on whether a video is the specific scene by the identification unit 11 is relatively low, it is possible to execute learning through supervised learning in such a way as to determine whether each video being extracted by the identification unit 11 is indeed the video of the specific scene. For example, the generation unit 13 may execute learning by using a principal component analysis and clustering. Further, for example, the generation unit 13 may execute learning by using a neural network (NN).

<<Estimation (Inference) Processing>>

Figure 7:
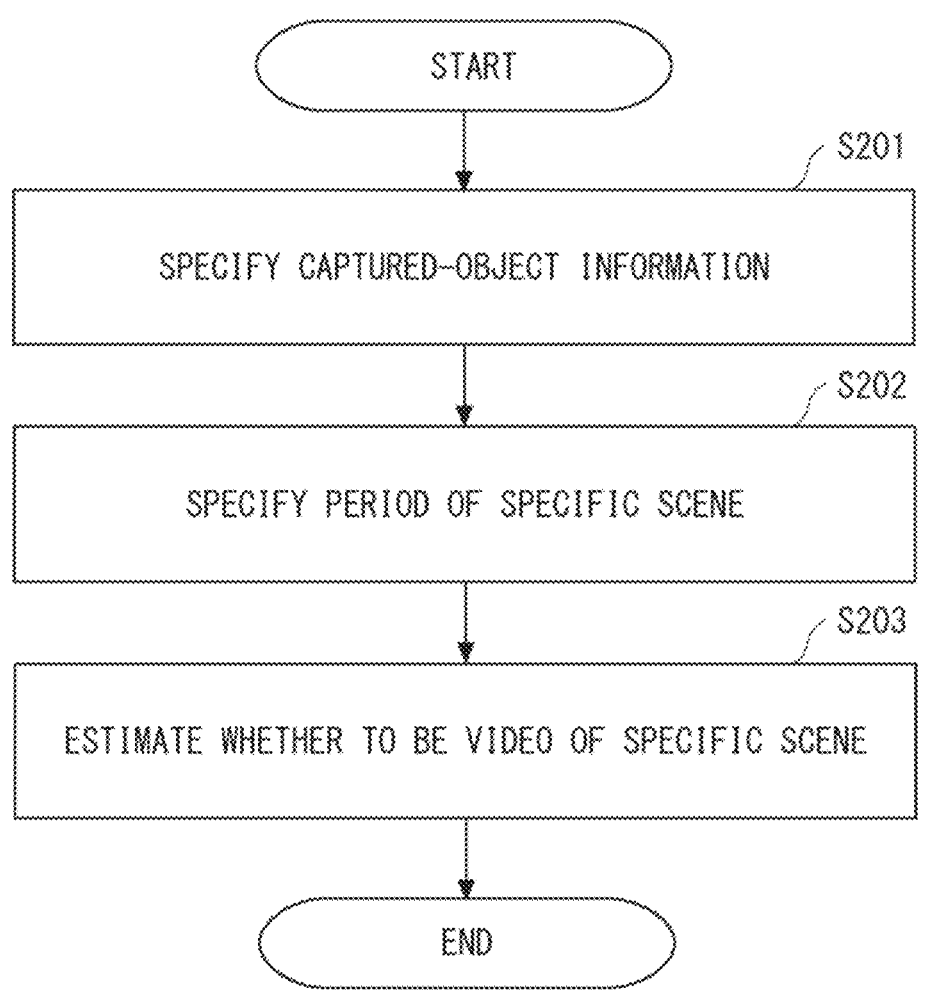
FIG. 7 is a diagram illustrating one example of estimation processing of the information processing apparatus according to the example embodiment.

Next, with reference to FIG. 7, description is made on one example of the estimation processing of the information processing apparatus 20 according to the example embodiment. FIG. 7 is a flowchart illustrating one example of the estimation processing of the information processing apparatus 20 according to the example embodiment.

In step S201, the specification unit 21 of the information processing apparatus 20 specifies (recognizes) the captured-object information being information relating to the captured object, based on the video captured by the image capturing apparatus 31 installed in the vehicle 30. The processing in step S201 may be similar to the processing in step S101 of FIG. 5.

Subsequently, the specification unit 21 of the information processing apparatus 20 specifies, from the period within the video captured by the image capturing apparatus 31 installed in the vehicle 30, the period in which the information being recognized from the video matches with the rule according to the specific scene (step S202). The processing in step S202 may be similar to the processing in step S102 of FIG. 5.

Subsequently, the estimation unit 22 of the information processing apparatus 20 estimates, based on the trained model for estimating whether the video in the specific period is the video of the specific scene and the captured-object information being recognized from the video in the period being specified by the specification unit 21, whether the video is the video of the specific scene (step S203). Note that the trained model is the trained model being generated by the information processing apparatus 10 in the processing of FIG. 5. For example, the captured-object information may include a distance between the vehicle 30 and the captured object, a speed of the captured object with respect to the vehicle 30, a position of the captured object with respect to the vehicle 30, or the like that is recognized from the video in the period.

With this, for example, a video of a specific scene can be extracted appropriately from videos being captured by the image capturing apparatus 31 and being accumulated. Thus, for example, it becomes easier for a technician (a developer, a user) to confirm whether the advanced driver-assistance system or the autonomous driving function of the vehicle 30 is operated appropriately during traveling on an actual road. Further, for example, it becomes easier for an insurance company or the like to confirm whether a driver of the vehicle 30 drives appropriately during traveling on an actual road.

For example, the accuracy achieved only by specification based on a rule defined (specified, designed) by a human or the like may not be sufficient. In contrast, according to the present disclosure, learning is executed by using a specification result based on a rule and a correct label provided by a human or the like, the specification result based on the rule is input to a trained model, and whether the specification result is correct is estimated (inferred). Thus, for example, as compared to a case with rule-based specification alone, the accuracy of specifying a specific scene can be improved.

Further, when only specification through the trained model is executed without executing rule-based specification, it is conceived that a load in the learning processing and the estimation processing is increased. Further, it is conceived that an enormous amount of learning data is required at the time of learning. In contrast, according to the present disclosure, rule-based specification is executed in a pre-step (pre-processing) of machine learning for the learning processing and the estimation processing. Thus, for example, a data mount of a video being a target of estimation target by the trained model to determine whether it is a specific scene can be reduced, and hence a load in the learning processing and the estimation processing can be reduced. Further, an amount of learning data required at the time of leaning can be reduced.

Modified Example

Each of the information processing apparatus 10 and the information processing apparatus 20 may be an apparatus included in one casing body, and each of the information processing apparatus 10 and the information processing apparatus 20 of the present disclosure is not limited thereto. Each of the units of each of the information processing apparatus 10 and the information processing apparatus 20 may be achieved by cloud computing configured by one or more computers, for example. In this case, at least part of the processing of each of the units of each of the information processing apparatus 10 and the information processing apparatus 20 may be executed in an external apparatus connected via a network. In this case, for example, the processing of specifying (recognizing) the captured-object information, based on the video in step S101 in FIG. 5 and step S201 in FIG. 7 may be executed by using an application programming interface (API) provided by an external apparatus. Further, for example, the information processing apparatus 10 and the information processing apparatus 20 may be the same apparatus. Each of the information processing apparatuses 10 and the information processing apparatus 20 that are configured as described above is included as one example of the "information processing apparatus" of the present disclosure.

Note that the present disclosure is not limited to the example embodiments described above, and may be modified as appropriate within the scope.

The whole or a part of the example embodiments described above can be described as, but not limited to, the following supplementary notes.

(Supplementary Note 1)

An information processing apparatus including:

a specification means for specifying, from a period within a video captured by an image capturing apparatus installed in a vehicle, a period in which information being recognized from a video matches with a rule according to a specific scene;

an acquisition means for acquiring a data set being a combination of information recognized from a video in the period specified by the specification means and a correct label indicating whether the video in the period is a video of the specific scene; and a generation means for executing learning, based on the data set acquired by the acquisition means, and generating a trained model for estimating whether a video in a specific period is a video of the specific scene.

(Supplementary Note 2)

An information processing apparatus including:

a specification means for specifying, from a period within a video captured by an image capturing apparatus installed in a vehicle, a period in which information being recognized from a video matches with a rule according to a specific scene; and an estimation means for estimating, based on information recognized from a video in the period specified by the specification means and a trained model, whether the video is a video of the specific scene.

(Supplementary Note 3)

The information processing apparatus according to Supplementary Note 2, wherein the trained model is a trained model being generated through learning based on a data set being a combination of information recognized from a video in a certain period and a correct label indicating whether the video in the certain period is a video of the specific scene.

(Supplementary Note 4)

The information processing apparatus according to any one of Supplementary Notes 1 to 3, wherein the information recognized from the video captured by the image capturing apparatus includes information indicating at least one of a distance between the vehicle and a captured object, a speed of the captured object with respect to the vehicle, and a position of the captured object with respect to the vehicle.

(Supplementary Note 5)

The information processing apparatus according to any one of Supplementary Notes 1 to 4, wherein the rule according to the specific scene includes information indicating at least one of a distance between the vehicle and a captured object, a speed of the captured object with respect to the vehicle, and positional transition of the captured object with respect to the vehicle.

(Supplementary Note 6)

The information processing apparatus according to any one of Supplementary Notes 1 to 5, wherein the specification means specifies, from a period of a first time length in which a video is captured by the image capturing apparatus, a period of a second time length in which information recognized from the video matches with the rule according to the specific scene, the second time length being shorter than the first time length.

(Supplementary Note 7)

The information processing apparatus according to any one of Supplementary Notes 1 to 6, wherein the specific scene includes at least one of a scene where a position of another vehicle is changed to a front of the vehicle due to lane changing of the another vehicle, a scene where a position of another vehicle is changed from a front of the vehicle due to lane changing of the another vehicle, and a scene of lane changing of the vehicle.

(Supplementary Note 8)

A generation method including:

specifying, from a period within a video captured by an image capturing apparatus installed in a vehicle, a period in which information being recognized from a video matches with a rule according to a specific scene;

acquiring a data set being a combination of information recognized from a video in the specified period and a correct label indicating whether the video in the period is a video of the specific scene; and executing learning, based on the acquired data set, and generating a trained model for estimating whether a video in a specific period is a video of the specific scene.

(Supplementary Note 9)

An information processing method including:

specifying, from a period within a video captured by an image capturing apparatus installed in a vehicle, a period in which information being recognized from a video matches with a rule according to a specific scene; and estimating, based on information recognized from a video in the specified period and a trained model, whether the video is a video of the specific scene.

(Supplementary Note 10)

A non-transitory computer-readable medium configured to store a program causing a computer to execute processing of:

specifying, from a period within a video captured by an image capturing apparatus installed in a vehicle, a period in which information being recognized from a video matches with a rule according to a specific scene;

acquiring a data set being a combination of information recognized from a video in the specified period and a correct label indicating whether the video in the period is a video of the specific scene; and executing learning, based on the acquired data set, and generating a trained model for estimating whether a video in a specific period is a video of the specific scene.

(Supplementary Note 11)

A non-transitory computer-readable medium configured to store a program causing a computer to execute processing of:

specifying, from a period within a video captured by an image capturing apparatus installed in a vehicle, a period in which information being recognize from a video matches with a rule according to a specific scene; and estimating, based on information recognized from a video in the specified period and a trained model, whether the video is a video of the specific scene.

REFERENCE SIGNS LIST

1 INFORMATION PROCESSING SYSTEM
10 INFORMATION PROCESSING APPARATUS
11 SPECIFICATION UNIT
12 ACQUISITION UNIT
13 GENERATION UNIT
20 INFORMATION PROCESSING APPARATUS
21 SPECIFICATION UNIT
22 ESTIMATION UNIT
30 VEHICLE
31 IMAGE CAPTURING APPARATUS
32 ECU

What is claimed is:

1. An information processing apparatus comprising:
at least one memory storing instructions, and
at least one processor configured to execute the instructions to:
specify, from a period within a video captured by an image capturing apparatus installed in a vehicle, a period in which information being recognized from a video matches with a rule according to a specific scene; acquire a data set being a combination of information recognized from a video in the specified period and a correct label indicating whether the video in the period is a video of the specific scene; and execute learning, based on the acquired data set, and generate a trained model for estimating whether a video in a specific period is a video of the specific scene, wherein the processor is configured to specify, from a period of a first time length in which a video is captured by the image capturing apparatus, a period of a second time length in which information recognized from the video matches with the rule according to the specific scene, the second time length being shorter than the first time length, or the specific scene includes at least one of a scene where a position of another vehicle is changed to a front of the vehicle due to lane changing of the another vehicle, a scene where a position of another vehicle is changed from a front of the vehicle due to lane changing of the another vehicle, and a scene of lane changing of the vehicle.

2. An information processing apparatus comprising: at least one memory storing instructions, and at least one processor configured to execute the instructions to: specify, from a period within a video captured by an image capturing apparatus installed in a vehicle, a period in which information being recognized from a video matches with a rule according to a specific scene; and estimate, based on information recognized from a video in the specified period and a trained model, whether the video is a video of the specific scene, wherein the processor is configured to specify, from a period of a first time length in which a video is captured by the image capturing apparatus, a period of a second time length in which information recognized from the video matches with the rule according to the specific scene, the second time length being shorter than the first time length, or the specific scene includes at least one of a scene where a position of another vehicle is changed to a front of the vehicle due to lane changing of the another vehicle, a scene where a position of another vehicle is changed from a front of the vehicle due to lane changing of the another vehicle, and a scene of lane changing of the vehicle.

3. The information processing apparatus according to claim 2, wherein the trained model is a trained model being generated through learning based on a data set being a combination of information recognized from a video in a certain period and a correct label indicating whether the video in the certain period is a video of the specific scene.

4. The information processing apparatus according to claim 1, wherein the information recognized from the video captured by the image capturing apparatus includes information indicating at least one of a distance between the vehicle and a captured object, a speed of the captured object with respect to the vehicle, and a position of the captured object with respect to the vehicle.

5. The information processing apparatus according to claim 1, wherein the rule according to the specific scene includes information indicating at least one of a distance between the vehicle and a captured object, a speed of the captured object with respect to the vehicle, and positional transition of the captured object with respect to the vehicle.

6. An information processing method comprising: specifying, from a period within a video captured by an image capturing apparatus installed in a vehicle, a period in which information being recognized from a video matches with a rule according to a specific scene; and estimating, based on information recognized from a video in the specified period and a trained model, whether the video is a video of the specific scene, wherein the method specifies, from a period of a first time length in which a video is captured by the image capturing apparatus, a period of a second time length in which information recognized from the video matches with the rule according to the specific scene, the second time length being shorter than the first time length, or the specific scene includes at least one of a scene where a position of another vehicle is changed to a front of the vehicle due to lane changing of the another vehicle, a scene where a position of another vehicle is changed from a front of the vehicle due to lane changing of the another vehicle, and a scene of lane changing of the vehicle.

* * * * *